United States Patent Office 3,404,676
Patented Oct. 8, 1968

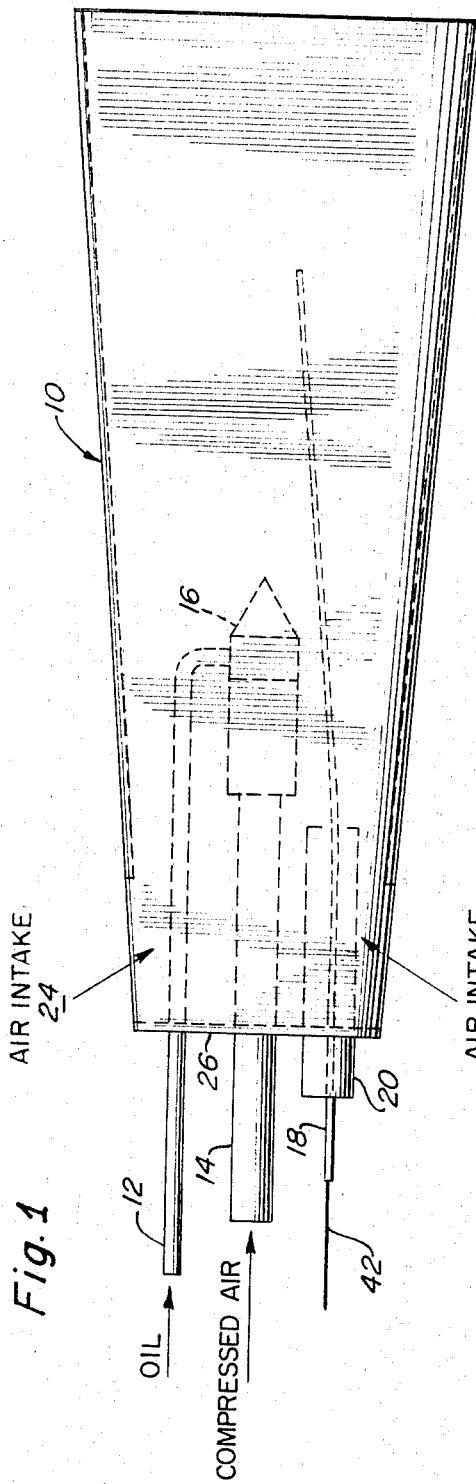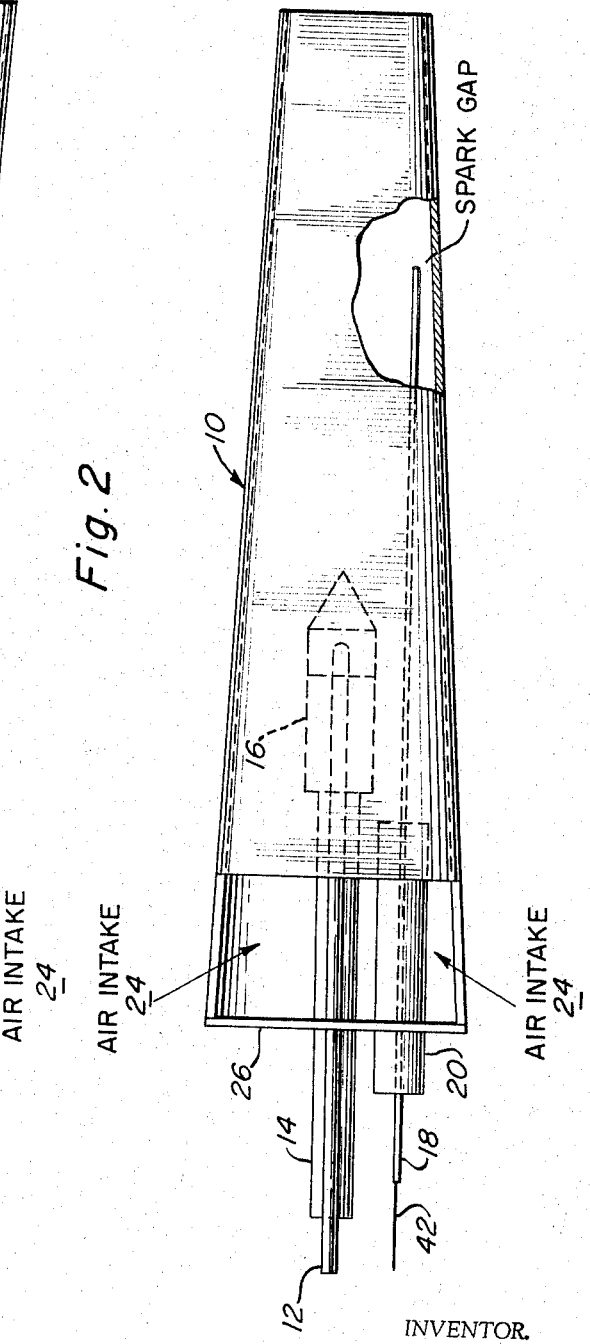

3,404,676
APPARATUS FOR FLAME CULTIVATION
Donald C. Walker, Munster, and Russell A. Hunt, Jr., Griffith, Ind., assignors to Standard Oil Company (Indiana), Chicago, Ill., a corporation of Indiana
Filed July 1, 1966, Ser. No. 562,313
4 Claims. (Cl. 126—271.2)

ABSTRACT OF THE DISCLOSURE

A flame cultivation apparatus including a flame cultivation assembly having a rack arrangement mounted on a tractor or other vehicle for movement over a field, the assembly having a compressor with drive means, an oil tank, electrical apparatus, all connected to a combustion zone by wires and conduits, the combustion zone having a nozzle for aspirating oil and an electrode for igniting the oil.

---

This invention relates to apparatus for flame cultivation and more particularly to an oil-fired flame cultivation burner.

Flame cultivation is a relatively new agricultural technique for controlling weed growth by applying a flame in a controlled manner to weeds and crop plants. If applied properly, the weeds are destroyed without significant injury to the crop plants. Flaming has several advantages over mechanical and chemical cultivation, but perhaps the most important are immediate evidence of weed control and the absence of chemical residue and soil sterilization problems.

Currently, the flame cultivators in use are fired with LPG. Although early development work in this area consisted of oil-fired apparatus, the burners and the necessary auxiliary equipment were bulky and cumbersome. The LPG burner equipment is relatively simple; however, it has a major disadvantage in that the cost of using LPG is about twice that of an oil fuel such as No. 2 fuel oil.

The flame cultivation burner in accordance with the present invention provides a practical oil-fired burner similar in size to the current LPG burner and has relatively simple, small-sized auxiliary equipment. Being oil-fired, it overcomes the major cost disadvantage of flaming with LPG and at the same time produces a flame which is clearly visible without adding additional apparatus for coloring the flame as in the case where LPG is burned and it is desired to have a clearly visible flame.

Briefly stated, the oil-fired flame cultivation apparatus of this invention comprises in combination burner means comprising a combustion chamber having an opened forward end and openings rearwardly of the forward end for admitting air to the chamber, first conduit means having one end positioned within the combustion chamber for supplying oil to the chamber, air-aspirating nozzle means positioned within the combustion chamber and attached to the first conduit means, second conduit means having one end attached to the nozzle means for supplying pressurized air to the nozzle means at a point whereby controlling the flow of air through the second conduit means will control the rate of flow of oil drawn through the first conduit means and ejected from the nozzle means. The apparatus of this invention may be further characterized by ignition means positioned within the combustion chamber at a point sufficient to ignite the oil being ejected from the nozzle means. Preferably, this ignition means comprises an electrode positioned within the chamber downstream from the nozzle means and, adapted to pass a spark from said electrode to a point of the combustion chamber whereby the oil will ignite as it ejects from the nozzle means. This apparatus is adapted to be carried by carriage or vehicle means along a plant row or rows to be flame cultivated.

The full nature of the invention will be understood from the accompanying drawings and the following description aid claims:

FIGURE 1 is a plain view illustrating the burner means of the invention.

FIGURE 2 is an elevational view illustrating the burner means of the invention.

Figure 3:
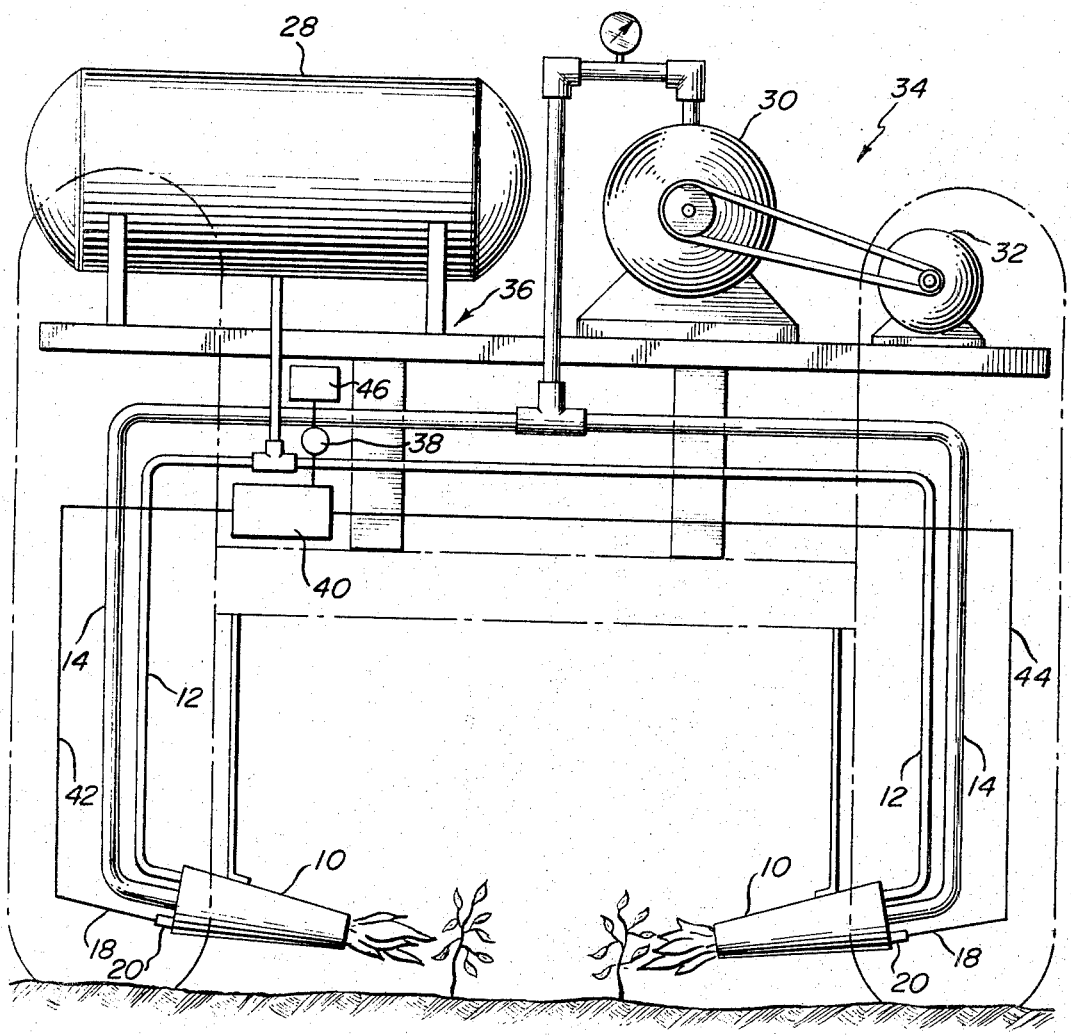
FIGURE 3 is a rear view of the assembly illustrating the flame cultivation equipment.

FIGURES 1 and 2 illustrate the burner means of the invention. Combustion chamber 10 is essentially a tapered metal box, rectangular in cross-section, having an open forward end. Air intakes 24 are provided to the rear of combustion chamber 10 for admitting air therein. Air-aspirating nozzle 16 is positioned within chamber 10, preferably along the axis of the chamber. Oil line 12 and compressed air line 14 are connected to nozzle 16. Preferably nozzle 16 is of the type which atomizes the oil and simultaneously induces a secondary air. Rear plate 26 of chamber 10 is adapted to fix the position of nozzle 16 within chamber 10. Oil may be fed to nozzle 16 either by gravity flow, by a metering pump, or by pressure. Oil line 12 is connected to nozzle 16 at point where compressed air passing through line 14 will draw oil from line 12 into nozzle 16 to be ejected. In this manner, when gravity flow is utilized, the flow of oil and hence the force by which it is ejected and the length of flame may be controlled by regulating the flow of compressed air. In alternative methods, that is, when a metering pump or a fuel tank pressurized with air is utilized, of course, the flow of fuel is regulated by the pump or air pressure, but the intensity of the flame may be controlled by the flow of compressed air.

In a preferred embodiment ignition means may be positioned within chamber 10 in order to have automatic ignition of the oil as it ejects from nozzle 16. This ignition means may conveniently be constructed of wire electrode 18 and insulator 20. The ignition means may be positioned within the chamber through near plate 26. Electrode 18 should be extended to a position sufficiently downstream of nozzle 16 so that oil ejecting from the nozzle will ignite upon contact with electrode 18. A spark gap is provided between electrode 18 and a plate or side of combustion chamber 10 and ignition is caused by passing a spark between electrode 18 and combustion chamber 10. It is, of course, contemplated, that this ignition system may be utilized in a gas system as well as in the fuel system of this invention.

The form or shape of the flame may be varied as desired by adjusting the position of nozzle along the axis of the chamber with respect to the open front end. A bushing arrangement in rear plate 26 will permit the adjustment as desired. Additionally, the form or shape of the flame produced may be varied by changing the height and width dimensions of the open front end and/or the dimensions of air intake 24. In the preferred embodiment it has been found that dimensionally having a combustion chamber rectangular in cross-section 10 inches in length, the width and height dimensions of the front end of 4 inches and 1½ inches, respectively, the air intakes 1½ inches in width, the rear plate about 2½" square, and positioning the nozzle about 5½" from the front end produces a flame whose shape gives very satisfactory results in flame cultivation. The electrode of the ignition means should be positioned about 2½" from the front and the spark gap between the point of the electrode and the chamber should be about ⅛".

FIGURE 3 illustrates flame cultivation assembly 34 as it could be supported on the rear of a tractor. The assembly may be constructed with four burners for two-row cultivation, with eight burners for four-row cultivation, or any multiple of two burners that the conveying means can handle. In the embodiment shown, oil drum or tank 28, compressor 30, and motor or compressor drive means 32 are all supported on rack arrangement 36. In the embodiment shown, a gravity feed system is used. As explained in reference to the other figures a metering pump may be utilized to feed the oil to the burner means. Additionally, drum 28 may be pressurized as a means of feeding oil to the burners. A pressure in the range of 5–20 lbs. would be, in most cases, satisfactory.

Motor or compressor drive means 32 drives compressor 20 and compressed air flows through lines 14 to the nozzles in combustion chambers 10. Oil from drum 28 is aspirated through lines 12 to the nozzles by the compressed air. Ignition may then take place. The ignition means is illustrated by electrodes 18 and insulators 20. In a preferred embodiment high voltage to the burner means is supplied through ignition wires 42 and 44 alongside the oil and compressed-air lines by a single automobile ignition coil 38 and a distributor 40 powered by a 12-volt DC motor (not shown). Power for the motor may be taken from the tractor's 12-volt electrical system or from battery 46. The battery, coil, and distributor are illustrated in this manner for the sake of simplicity. Preferably they would be positioned on rack arrangement 36 for convenience of operation. A 4-cylinder distributor works well for a two-row cultivator with four burners, but an 8-cylinder distributor is necessary for a four-row cultivator with eight burners.

The assembly 34 and particularly rack 36 may be altered to provide for more burner means at various positions depending on the particular arrangement desired. In addition, compressor 30 may be relocated and driven with the power take-off from the engine of the tractor rather than motor or drive means 32.

The performance characteristics of the present invention in its preferred embodiment were determined by comparing its flame-temperature profiles with those of a regular size LPG burner. Profiles were obtained from a bank of 15CA thermocouples, each sheathed in No. 446 stainless steel. The thermocouples were arranged 2 inches apart in a horizontal line. The flame was directed at the center thermocouple, and the temperature of opposing thermocouples (on each side of the center thermocouple) were averaged to reduce the effect of extraneous air currents in the laboratory. The thermocouple bank was moved horizontally at 2-inch intervals away from the burner to obtain longitudinal profiles, and vertically at 1-inch intervals to obtain cross-sectional profiles. Temperatures were recorded by a Brown "Electronik" multiple-printing, strip-chart recorder calibrated from 0 to 2400° F.

The LPG burner was fired at the recommended rate of 4.8 g.p.h., using 20 lbs. pressure LPG, and a longitudinal profile was obtained. Profiles were then determined for the burner of this invention fired at various oil rates and pressures. The results showed that the burner of this invention, fired at 2.1 g.p.h. No. 2 fuel oil and 31 lbs. air pressure produced a flame essentially the same as that of the LPG burner. Cross-sectional profiles were taken at a point 16 inches from the burners showed that the flame produced by the burner of the present invention was slightly flatter and wider than that of the LPG flame, but not significantly different.

The ground-hugging characteristics of the flames were then determined by impinging the flames onto a metal plate and determining cross-sectional profiles of the deflected flames. The metal plate was water-cooled in order to simulate actual ground temperature. The burners were positioned so that the flames struck the plate at a 30° angle, 16 inches away from the burner. This is the burner position generally used when row crops are cross-flamed. Cross-sectional profiles were taken 2 inches (position of crop plant) and 8 inches beyond the point of center-flame contact with the plate. The profiles showed that the ground-hugging qualities of the two flames were nearly identical.

Wind resistance of the flames was determined by measuring the deflection of the flames from the axis of the burners when a constant-velocity wind was applied at right angles to the axis. The flames were directed at the thermocouple bank 22 inches from the burners, and the wind was supplied by a fan positioned about 6 feet away from the flames. The speed of the fan was adjusted until the wind velocity was about 7 m.p.h., as measured by an anemometer placed directly in front of the burner. The deflection of the flame of the present invention at 2.1 g.p.h. was the same as the LPG flame at 20 lbs. pressure (4.8 g.p.h.). Wind resistance of the LPG flame can be increased (less deflection) only by raising the LPG pressure. This results, however, in a considerable increase in the firing rate. On the other hand, the resistance of the distillate flame can be increased by raising the air pressure. The best resistance, however, is obtained by also increasing the firing rate a small amount (in the order of 0.3 g.p.h.).

Thus, a burner has been provided which has performance characteristics equal to those of LPG at a greatly reduced operating cost. In addition, the burner of the present invention is more versatile than the LPG burner. The length of the distillate flame can be varied from 8 inches to 36 inches by increasing the firing rate (at 31 lbs. air pressure) from 1.1 to 2.9 g.p.h. at 40 lbs. air pressure; shorter and higher-velocity flames are obtained at any given firing rate. The shorter flames are blue, but the color gradually changes to white as the flame length and firing rate increases. The white flame produced is clearly visible even in bright sunlight. However, for the LPG flame, the length increases only by 7 inches as the LPG pressure is raised from 10 to 35 lbs. For this reason it is necessary to have about three separate burners to cover the same range of flame lengths provided by the present burner. Thus the LPG burners on a cultivator have to be changed when a different flame is needed.

Having described the invention, what is claimed is:

1. Oil-fired burner apparatus adapted to be carried by a vehicle along a plant row to be flame cultivated, said apparatus comprising:

(a) a flame cultivation assembly having a rack arrangement for movement over a field, the assembly including a combustion chamber and having an air compressor with drive means, an oil tank, and an electrical system connected to said combustion chamber for supplying air, fuel, and ignition to the combustion chamber;

(b) said combustion chamber having an open forward end and openings rearwardly of said open forward end admitting air therein;

(c) first conduit means having one end positioned within said combustion chamber and the other end connected to said oil tank, for supplying oil to said one chamber;

(d) air-aspirating nozzle means attached to said first conduit means within said chamber for ejecting said oil into said chamber toward said open forward end;

(e) second conduit means having one end positioned within said combustion chamber and the other end connected to said air compressor, said end being attached to said nozzle means, said second conduit means being adapted to supply pressurized air through said nozzle means in a manner whereby controlling the flow of air through said second conduit means will control the amount of said oil drawn through first conduit means and ejected from said nozzle means; and (f) ignition means positioned within said combustion chamber connected to said electrical system and adapted to ignite said oil as it ejects from said nozzle means.

2. The apparatus of claim 1 wherein said air-aspirating nozzle means is adapted to atomize said oil and simultaneously induce a secondary air through said nozzle means.

3. The apparatus of claim 1 wherein said ignition means comprises an electrode positioned within said combustion chamber downstream from said nozzle adapted to pass a spark between said electrode and said combustion chamber to ignite said oil after it is ejected from said nozzle means.

4. The apparatus of claim 3 wherein said ignition means is further characterized by ignition coil means and distributor means connected to said electrode.

References Cited

UNITED STATES PATENTS

| 1,199,716 | 9/1916 | Severs | 158—76 |
| 2,273,254 | 2/1942 | Davis | 126—271.2 |
| 2,487,353 | 11/1949 | McLemore | 158—28 |
| 2,627,308 | 2/1953 | Clark. | |
| 2,996,113 | 8/1961 | Williams. | |

CHARLES J. MYHRE, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,404,676                                October 8, 1968

Donald C. Walker, et al.

It is certified that error appears in the above identified patent and that said Letters Patent are hereby corrected as shown below:

Column 2, line 5, "aid" should read -- and --; line 6, "plain" should read -- plan --; line 41, "near" should read -- rear --. Column 4, line 58, cancel "one"; line 66, after "said" insert -- one --.

Signed and sealed this 17th day of March 1970.

(SEAL)
Attest:

Edward M. Fletcher, Jr.                        WILLIAM E. SCHUYLER, JR.
Attesting Officer                                    Commissioner of Patents